Nov. 10, 1970  M. A. BREIER  3,538,529
AIRCRAFT LOADING EQUIPMENT
Filed Dec. 23, 1968  5 Sheets-Sheet 1
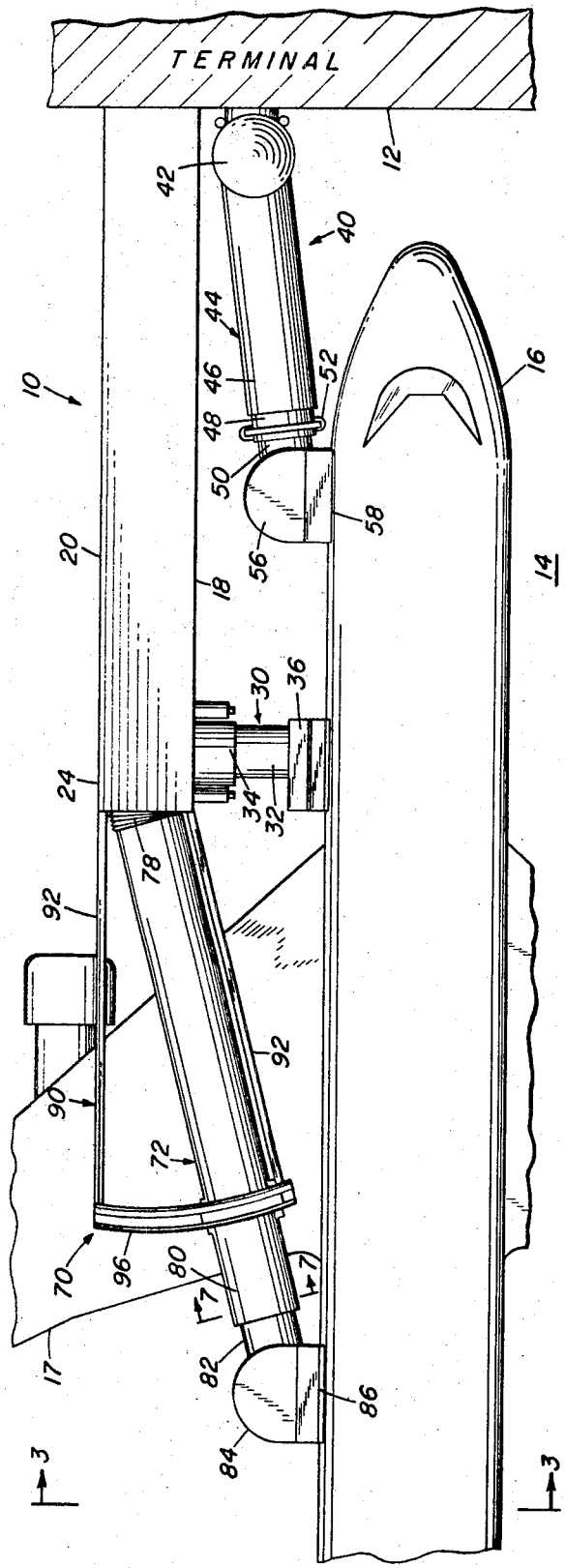
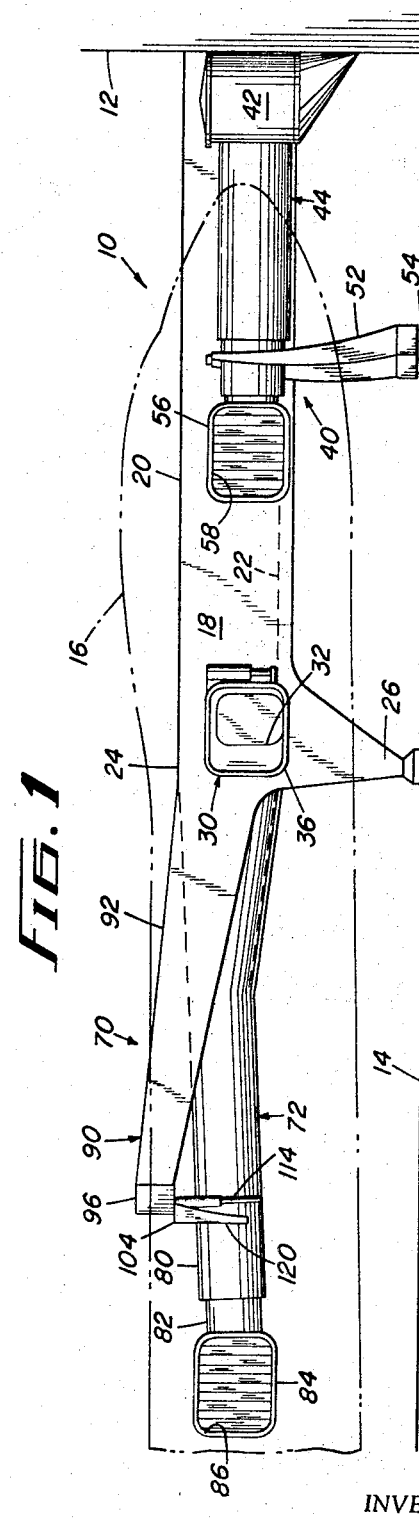
INVENTOR.
MORTON A. BREIER
BY
ATTORNEY

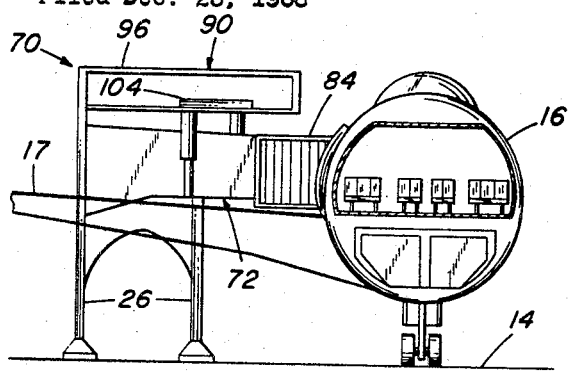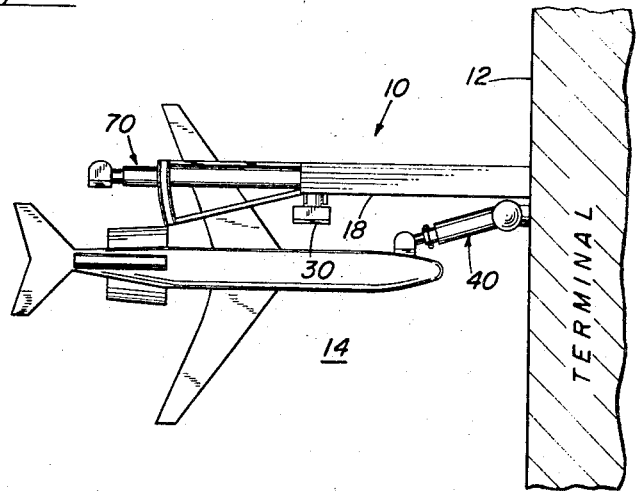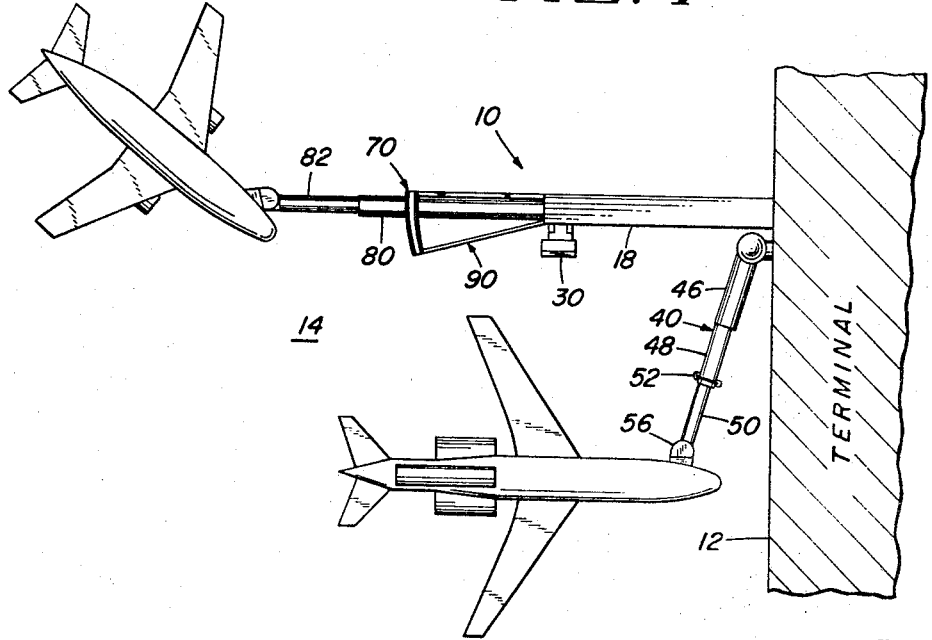

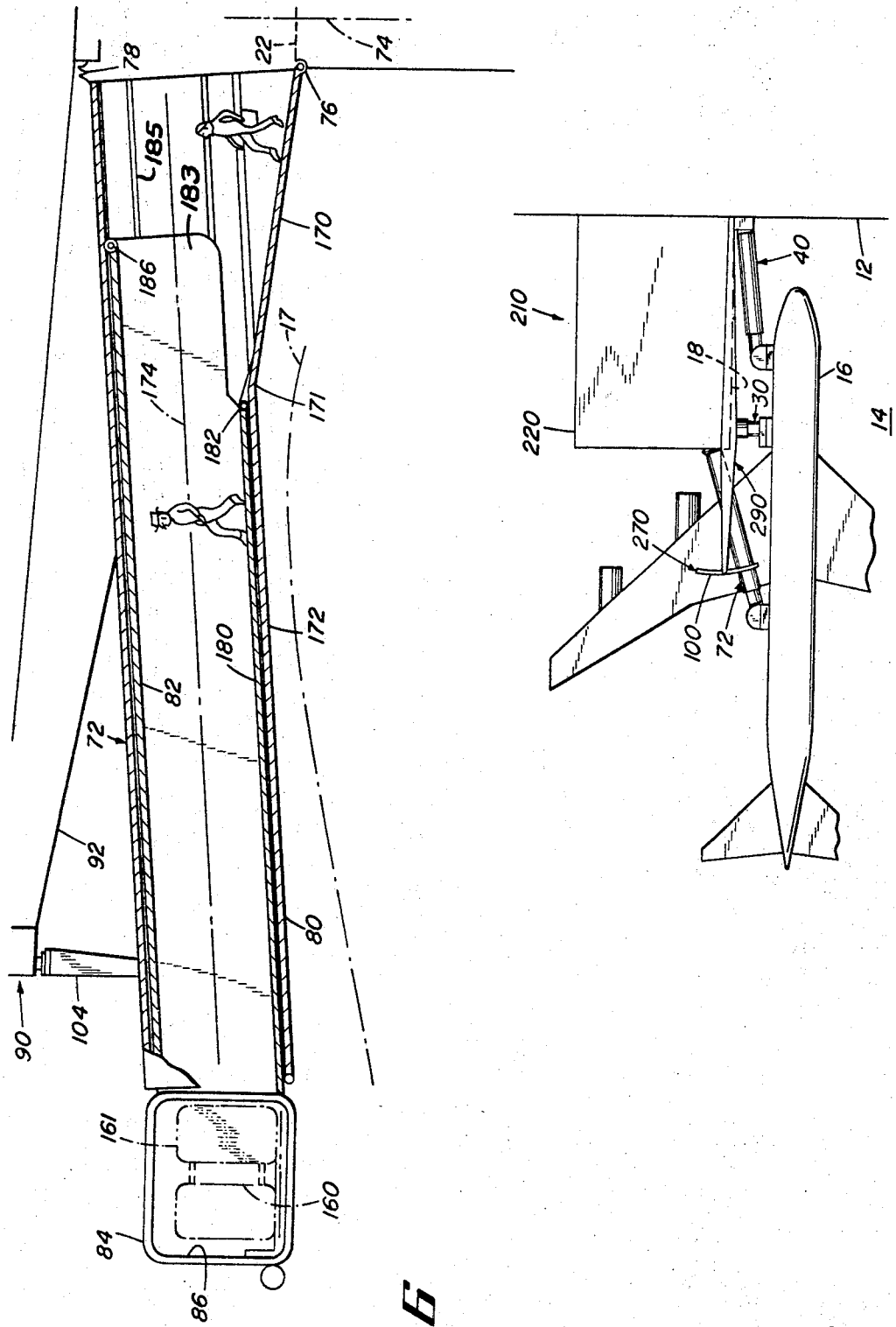

Nov. 10, 1970 M. A. BREIER 3,538,529
AIRCRAFT LOADING EQUIPMENT
Filed Dec. 23, 1968 5 Sheets-Sheet 4

INVENTOR.
MORTON A. BREIER
BY
ATTORNEY

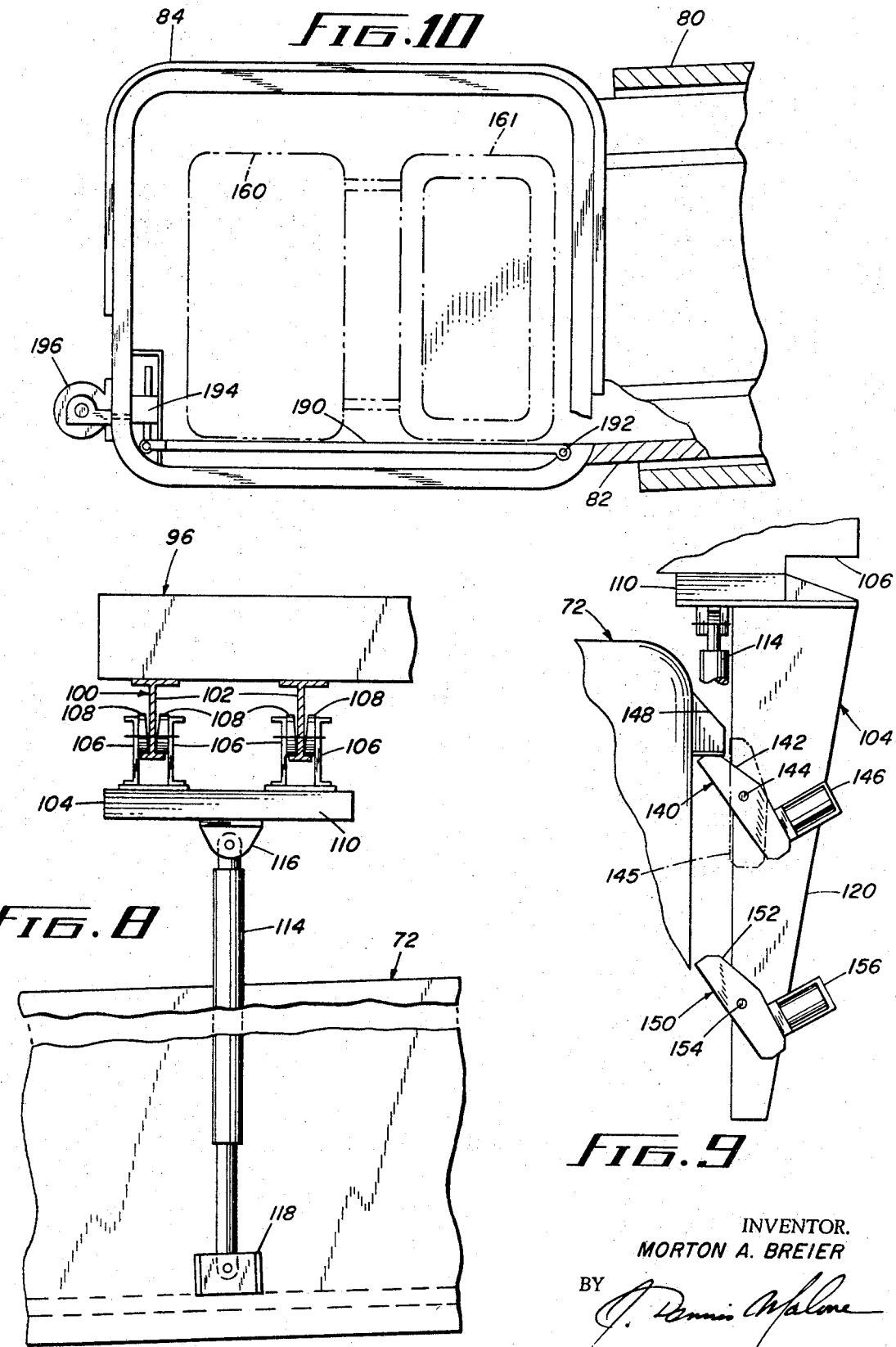

United States Patent Office 3,538,529
Patented Nov. 10, 1970

3,538,529
AIRCRAFT LOADING EQUIPMENT
Morton A. Breier, Greenwich, Conn., assignor to Dorr-Oliver Incorporated, Stamford, Conn., a corporation of Delaware
Filed Dec. 23, 1968, Ser. No. 786,181
Int. Cl. B65g 11/00
U.S. Cl. 14—71                                                  12 Claims

ABSTRACT OF THE DISCLOSURE

The present invention relates to unique aircraft loading equipment wherein elongated loading modules extend out from an aircraft terminal building into an aircraft parking ramp area. Such an elongated loading module may be approached by aircraft nosed-in toward the terminal with the aircraft fuselage parallel to and closely adjacent the module whereby the access doors along one side of the aircraft may be utilized for loading while keeping the opposite side of the aircraft clear for other servicing operations. The invention further provides a novel loading bridge having an overhead support. The bridge may be utilized in such a loading module in which case the bridge may extend over a wing of the aircraft to mate with the rearward aircraft doors.

BACKGROUND OF THE INVENTION

It is generally recognized that the loading of aircraft having doorsills located at substantial heights above the ground is not efficiently or satisfactorily carried out by the use of stairways positioned at the aircraft to get passengers from ground level to the aircraft floor level. Accordingly, most large airport terminals are now designed around the concept of providing passenger facilities such as lounges at an elevated level approximating the level of the aircraft floor and then transporting passengers through enclosed passageways to the aircraft doorway with no substantial change in elevation. Generally these passageways or portions of them have some degree of movement to permit accurate mating with the doors of parked aircraft.

There have been two basic techniques of positioning aircraft alongside passenger terminals to permit interconnection of the aircraft and the terminal by such passageways; these two techniques are parallel parking and nose-in parking. Parallel parking offers the advantages that the aircraft arrives and departs from its parked position under its own power, and thus requires no tow tractor in its turnaround cycle. Further, the orientation of the aircraft with respect to the terminal facade in parallel parking facilitates access to aircraft doors either forward of or aft of the wing with known ramp supported loading bridges.

However, parallel parking presents one very significant disadvantage. Parallel parking necessitates certain aircraft turning and maneuvering room, and therefore this technique requires significantly greater terminal facade length than does the nose-in technique. Another disadvantage of parallel parking is that departure of an aircraft from a parallel parked position requires substantial engine thrust to start and turn the aircraft. As the aircraft departs, the exhaust of the aircraft engines is directed toward the terminal building and toward the ground equipment and personnel located adjacent the terminal with a resultant shaking of the terminal building and disruption of ground operation activities.

In view of these disadvantages, many large terminals utilize nose-in parking. However, with nose-in parking, known passenger loading equipment can service only the forward doors of the aircraft. Consequently, all passengers must move to the front of the aircraft to deplane. Aircraft door and aisle design is such that passenger flowrates along aircraft aisles is the limiting factor which slows the deplaning operation. That is, the aircraft doorways and most passenger loading devices are capable of handling substantially higher passenger flowrates than are the aircraft aisles.

In view of this situation, the present invention provides unique aircraft loading structures which provide access to the rearward as well as the forward doors of a nosed-in aircraft. In this manner, the length of in-plane aisle which the passenger must traverse, and accordingly the deplaning delay, can be reduced substantially, for example, by a factor of two. This reduction in deplaning delay not only avoids adverse passenger reaction but also substantially increases safety under conditions requiring fast deplaning as in the case of a fire on the ramp or in the aircraft at the terminal.

Further, for large aircraft nosed-in to the terminal, known passenger loading equipment may have to be employed on both sides of the aircraft to service a plurality of forward doors. In contrast, with the unique configuration of the module of the present invention, only doors on one side of the aircraft need to be serviced for passenger loading. Consequently, the other side of the aircraft is left completely free for other servicing operations such as cargo and commissary loading.

SUMMARY OF THE INVENTION

It is an object of the present invention to permit rapid deplaning of aircraft parked nose-in at a terminal by providing passenger access to forward and rear doors of the aircraft. Another object is to provide aircraft loading equipment which services a plurality of aircraft doors on one side of the aircraft whereby the opposite side is left free for other servicing functions. A further object of the invention is to provide an overhead supported aircraft loading bridge whereby the ramp area is kept free of bridge supporting structure so as to avoid any interference with the operation of ramp equipment such as trucks. These objects are accomplished by the unique structures of the present invention which include aircraft loading structures or modules which extend out from the terminal facade into the aircraft parking or ramp area so that aircraft can park nose-in to the terminal parallel to and closely adjacent one face of the loading modules, hereinafter called the module service face. The module includes a static structure extending generally transversely out from the terminal facade. At the outer end of the static structure, at least one unique overhead supported loading bridge extends in a direction which is generally an extension of the module service face. The lengths of the static structure and of the loading bridge are such that the loading module may accommodate a large aircraft generally parallel to the module service face with one wing of the aircraft located under the loading bridge which extends out from the outer end of the static structure. This over-the-wing bridge is then capable of mating with and serving as a passenger access to and from the rearward doors of the aircraft.

The loading arrangement is also provided with further passenger loading devices for the forward aircraft doors. Specifically, these devices may be one or more telescoping passageways which extend transversely out from the module service face and/or may be loading bridges pivoted for horizontal and vertical swinging motion about their inner end located adjacent the intersection of the terminal facade with the module service face.

The overhead supported loading bridge is uniquely supported by a cantilevered structure which extends out from the static structure of the module to support a track which extends above and generally transversely or arcuately to the passageway of the bridge. A carriage rides on such track and supports the bridge passageway by vertically extensible supports. Operation of the carriage along the track effects horizontal swinging of the bridge passageway about its pivoted inner end and actuation of the vertically extensible supports effects vertical swinging of the passageway. The track and the carriage are located out a substantial distance from the pivoted inner end of the bridge at a location intermediate to the length of the passageway. With this arrangement more accurate control of the bridgehead at the outer end of the passageway is possible than with a passageway moving means located adjacent to the pivot axes of the bridge.

The overhead supported bridge may be telescopically extensible, and specifically may be of the type wherein an outboard section, to which the bridgehead is affixed, telescopes within a larger inboard section. Further, according to the present invention, the bridge may have a unique bend or kink in its telescoping passageway to permit the bridge to clear the wing of an aircraft while providing for a floor level at the interconnection of the bridge and the static structure which is lower than would otherwise be possible.

The unique overall arrangement of the elongated module of the present invention permits substantial flexibility in servicing a number of different aircraft. That is, in addition to servicing a plurality of doors on one side of an aircraft nosed in alongside the module, two smaller aircraft can be simultaneously served. In this usage, one aircraft is positioned out beyond the elongated module along the line of extension thereof and a forward door of this aircraft is served by the overhead-supported loading bridge. The second aircraft is parked nosed-in either parallel to or angularly to the static structure adjacent the corner formed by the terminal facade and the service face of the module, and a forward door thereof is served by one of the loading devices positioned along the module service face.

These objects of the present invention as well as other objects will more clearly appear from the following description and appended claims when read in conjunction with the accompanying drawings.

BRIEF DESCRIPTION OF THE DRAWINGS

FIG. 1 is a top veiw of the aircraft loading module of the present invention with a large aircraft positioned alongside and shows the various loading devices of the module mated with respective forward and rearward doors along one side of the aircraft.

FIG. 2 is a side view of the loading module of FIG. 1 with the aircraft shown in dash-dot lines.

FIG. 3 is a view taken on line 3—3 in FIG. 1 and shows an end view of the module with an aircraft alongside.

FIG. 4 is a top view of the module of FIG. 1 and shows a method of servicing one realtively small aircraft positioned alongside.

FIG. 5 is a top view of the module of FIG. 1 and shows how the respective loading devices of the module may be used to service two aircraft simultaneously.

FIG. 6 is a vertical longitudinal section taken through the overhead supported loading bridge of the module of FIG. 1 and shows the unique bend in the passageway of that bridge.

FIG. 8 is a side view of the carriage of FIG. 7 shown with the side guides of the carriage removed for clarity.

FIG. 9 is an end view similar to FIG. 7 but shows the details of certain stop mechanisms which control the downward movement of the overhead supported bridge.

FIG. 10 is an enlargement of a portion of the overhead supported bridge of FIG. 6 and shows its adjustable tilt floor.

FIG. 11 is a top view of a modified version of the aircraft loading module of FIG. 1.

DESCRIPTION OF THE INVENTION

Figure 7:
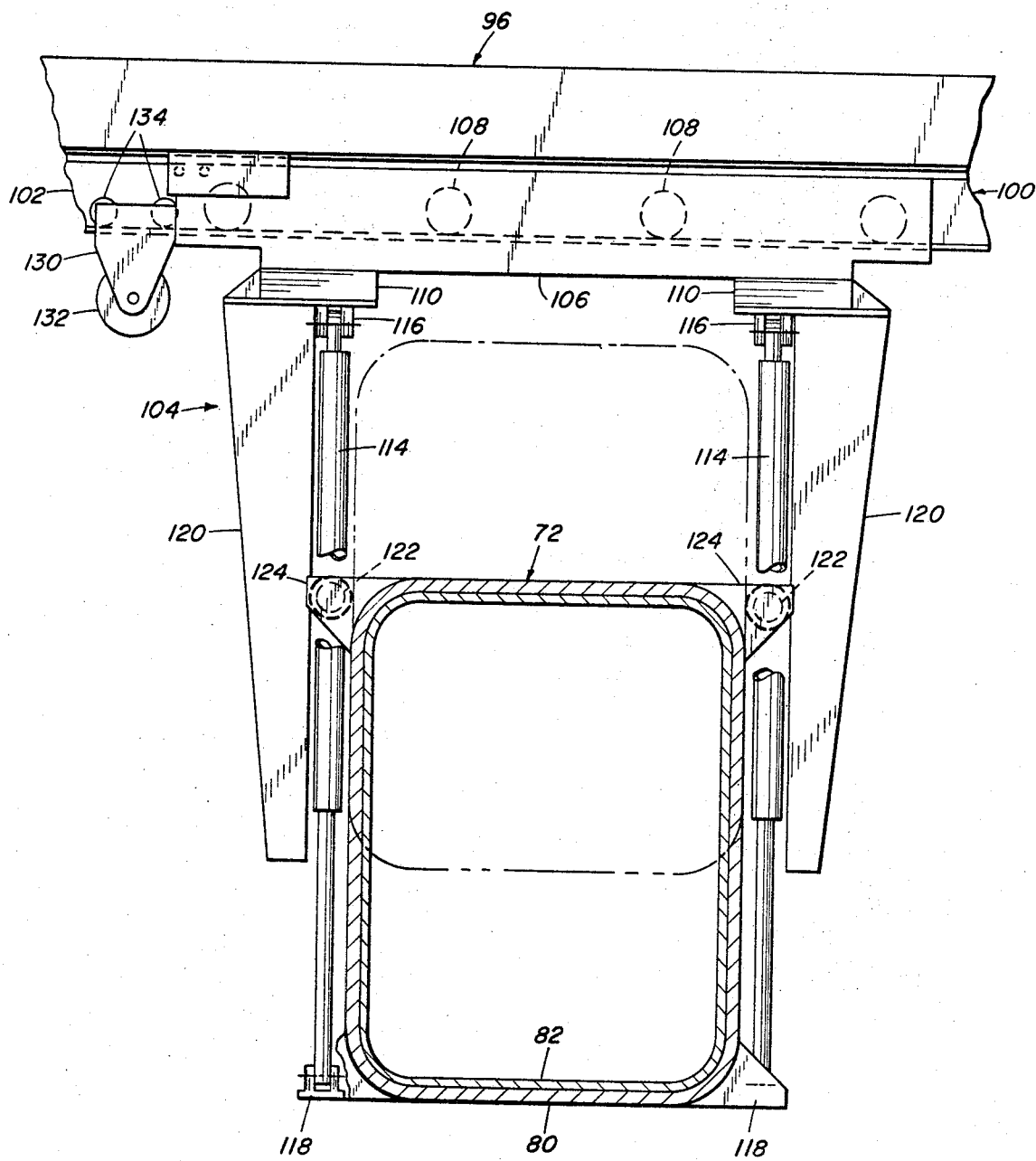
FIG. 7 is a vertical section taken substantially on line 7—7 in FIG. 1 and shows the overhead supported carriage of the bridge.

Referring to the drawings, FIGS. 1 to 5 show an aircraft loading module 10 according to the present invention. Loading module 10 is generally elongated and extends out from a facade 12 of a terminal building into an aircraft parking or ramp area 14 upon which an aircraft 16 may be parked nose-in to the terminal with its longitudinal axis oriented generally parallel to, and relatively close alongside, one face 18 of the elongated module, hereinafter called to module service face.

Module 10 includes a static structure 20 which extends out from terminal facade 12 at an elevation such that the floor level 22 (FIG. 2) of the structure is located approximately at the floor level of aircraft 16. Static structure 20 terminates at an outer end 24 which is preferably ground supported on structure 26. The outer end of the static structure is at a distance from the terminal facade such that ground supports 26 do not interfere with the wing 17 of the aircraft alongside the loading module.

One or more aircraft loading devices are positioned along or adjacent to module service face 18 to provide access from the terminal and/or the module to the forward door or doors of the aircraft. Specifically, in the embodiment shown in FIGS. 1 to 5, a passageway 30 of the so-called nose dock type extends transversely out from service face 18 of static structure 20. Passageway 30 includes a telescoping section or tube 32 mounted within another tube 34. Tube 34 is mounted upon static structure 20 to permit vertical swinging of passageway 30 about a horizontal axis located in proximity to and parallel with module service face 18. A bridgehead 36 is mounted on the outer end of passageway 30 and has flexible structures to provide a weather seal around the aircraft doorway. The bridgehead provides sufficient clearance space to permit the aircraft door to be swung open within the confines of the bridgehead. Through the combined operation of the telescoping tubes and the vertical swinging of passageway 30, the bridgehead 36 can be brought into accurate alignment with the doorsill of one of the forward doors of aircraft 16.

A further loading device or bridge 40 is incorporated in module 10 adjacent its service face 18. Bridge 40 includes a rotunda 42, preferably positioned adjacent the corner formed by the terminal facade 12 and module service face 18. Rotunda 42 may connect through face 18 to communicate with the interior of the module, or it may be preferable to have rotunda 42 communicate through facade 12 to the interior of the terminal. This latter arrangement may be advantageous to obtain a better separation between those passengers utilizing bridge 40 and those passengers utilizing the remaining loading devices of the module. A further advantage of this latter arrangement accrues when the floor level of the terminal is slightly lower than the floor level of the static structure. In this case bridge 40 slopes up from rotunda 42 at the terminal level to mate with the forward door of a large aircraft such as shown at 16 and slopes down to mate with the forward door of planes having low doorsills. This down slope is more moderate, for bridge of a given length, than it would be if the bridge rotunda 42 were located at the higher elevation of floor level 22 of the static structure of the module.

A telescoping passageway 44 is mounted at its inner end on rotunda 42 for horizontal swinging motion about a vertical axis and for vertical swinging motion about a horizontal axis. Telescoping passageway 44 includes two or more interfitting sections 46, 48, and 50. The outer end of passageway 44 is supported, for example, by a mover 52 having ground engaging wheels 54. In the embodiment shown in FIGS. 1 to 5, the mover is connected to intermediate section 48 of the passageway. In such an arrangement, wheels 54 would be steerable so as to accommodate both the telescoping action of section 48 as well as the horizontal swinging motion of the bridge. Movable support 52 includes means to elevate and depress the passageway and thus provides for the vertical swinging motion of the passageway about the horizontal axis at rotunda 42. A bridgehead 56 is mounted upon the outer end of outboard passageway section 50 for rotation about a generally vertical axis. The bridgehead may be rotated so that the plane of its doorway 58 may be oriented parallel to the doorway of an aircraft.

At the outer end of static structure 20, the loading module continues its outward extension into the ramp area with a unique overhead supported loading bridge 70 which is shown generally in FIGS. 1 to 5 and detailed in FIGS. 6 to 10. Bridge 70 includes a telescoping passageway 72 which includes at its inner end for horizontal swinging about a vertical axis 74 (FIG. 6) and for vertical swinging about a horizontal axis 76. A flexible connection 78 between the inner end of passageway 72 and the outer end of static structure 20 provides a weather seal therebetween. In the embodiment shown, passageway 72 includes two telescoping sections or tubes 80 and 82. At the outer end of the passageway, a bridgeway 84 is mounted for rotation about a generally vertical axis to permit the bridgehead doorway 86 to align with the aircraft doorway to be served.

Telescoping passageway 72 and bridgehead 84 are supported by a cantilever structure 90 which is connected to, and extends outwardly from, the outer end 24 of the static structure 20. In the embodiment shown, cantilever structure 90 includes two beams 92 of substantial vertical depth which are connected to static structure 20 on either side of the inner end of passageway 72. Beams 92 extend outwardly at an upward inclination so that their outer ends are at an elevation above passageway 72. Beams 92 also extend out at diverging angles as shown in the top views of the drawings to allow for horizontal swinging of the passageway between the beams. At their outer ends, beams 92 are interconnected by a cross structure 96 upon which is supported a track 100 oriented generally transversely to the elongated module and to passageway 72. In the embodiment illustrated, track 100 is arcuate about vertical axis 74 of the passageway. However, it is within the scope of the present invention that, for limited angles of horizontal swing, a straight track could be utilized. Further, in certain installations a track which is arcuate about a point which is displaced from the pivot axis of the passageway may be desirable.

As shown in FIGS. 7 to 9, support track 100 includes two rails 102 upon which a carriage 104 is movably suspended by rollers 108. The carriage includes frame beams 106 upon which the rollers are mounted and which beams are interconnected by cross members 110. Extensible actuators, in this case hydraulic cylinder assemblies 114, are dependingly mounted at brackets 116 upon cross members 110. The cylinders are free to swing in a vertical plane oriented parallel to the length of passageway 72. The lower ends of cylinders 114 are connected to passageway support brackets 118 on horizontal pivot axes which are transverse to passageway 72. Passageway support brackets 118 are fixed to the inboard passageway section 80 within which the outboard section 82 telescopes.

Passageway side guides 120 are dependingly mounted upon carriage cross members 110. These guides serve as a track upon which passageway side rollers 122 (FIG. 9) bear. The rollers are mounted by brackets 124 upon the inboard passageway section 80. Side guides 120 and rollers 122 serve to transmit lateral forces between the carriage 104 and the passageway 72 and thus serve to prevent undesirable lateral movement of the passageway relative to the carriage. A suitable source of hydraulic power (not shown) with appropriate controls is connected to cylinder assemblies 114 to control and synchronize the extension and retraction thereof so as to elevate and lower passageway 72 about its inner end. Carriage 104 has a suitable actuation mechanism 130 to move the carriage along track 100. As shown, carriage actuator 130 is connected to the carriage and includes an electric motor 132 which operates drive rollers 134 which frictionally engage rails 102 to move the carriage therealong. This horizontal drive arrangement may alternately be by a stationary rack adjacent to the rail with a driven pinion carried by the carriage, by screw actuation, or by a hydraulic cylinder mounted between the fixed structure and the movable carriage. Also locking features, such as clamp pads, may be used to lock the carriage to the rails at any selected location.

With carriage 104 located at a substantial distance from the pivot axes of the passageway, control of the movement and position of the outer end of the bridge is much more accurately controlled than if the bridge actuation were accomplished by mechanism adjacent the pivoted inner end of the passageway. This advantage accrues because the movement amplification or leverage ratio is reduced when the actuation mechanism is located out away from the pivot point, and because any clearances or "slop" between the carriage and the passageway are similarly less magnified, and because the extent of, and therefore the inertia of, the bridge components located out beyond the carriage is minimized with such a location for the carriage.

Each side guide 120 mounts down stops 140 and 150 (FIG. 9) each of which respectively includes a pivoted stop latch 142 and 152 pivoted on pins 144 and 154 and operated by a suitable actuator 146 and 156 between the full line positions and the dash-dot line position shown for example at 145 in FIG. 9. Upper stops 140 are adapted to engage a set of stop brackets 148 fixed to either side of inboard section 80 of the passageway when the passageway is in its full-up or stored position. Thus, stops 140 retain the bridge in a stored position even though hydraulic power to cylinder assemblies 114 is cut off. To put the bridge in operation, passageway 72 is raised slightly from its stored position to permit the retraction of stops 140 after which the passageway can be lowered as desired.

Lower stops 150 are provided to establish a definite down limit to prevent accidental contact of the passageway with wing 17 of aircraft 16 thereunder. These stops serve to prevent such contact either in case of careless operation of the bridge or in case of power failure while the bridge is being operated. However, in certain uses of bridge 70, for example as indicated in FIGS. 4 and 5, there may be no aircraft under the bridge or the aircraft thereunder may be smaller and lower than the aircraft 16 shown in FIGS. 1 to 3 and 6. In these circumstances it may be desirable to lower the bridge beyond the limit established by stops 150. In this case, the operator of the bridge can intentionally override stops 150 by operating actuators 156 to retract latches 152 so as to permit the passageway to pass below the down limit.

As shown in FIGS. 2, 3, and 6, the telescoping sections of passageway 72 are uniquely constructed to provide adequate clearance between the passageway and the upper surface of wing 17 of the aircraft while permitting the passageway floor at the inner end of the passageway to be located substantialy at the floor level of static structure 20. As shown in FIG. 3, the upper surface of wing 17 of aircraft 16 is located at approximately the floor level of the aircraft. Accordingly, as shown in FIG. 7 the passageway 72 necessarily inclines downwardly from a point over wing 17 toward the bridgehead when it is aligned around the area of a rear doorway 160 and door 161 of the aircraft. This inclination of the over-the-wing passageway means that, were the floor of the passageway continued straight back to the static structure, the passageway floor would terminate at a level substantially higher than the level of the aircraft floor or floor level 22 of the static structure.

However, a unique passageway configuration may be utilized in the present invention to provide for a sloped or ramped portion in the floor of the inboard passageway section while maintaining structural integrity and strength when the passageway is fully extended. Further, this unique configuration permits maximizing extended length while minimizing retracted length of the telescoping passageway. To accomplish these results, a bend 171 in floor 172 of the inboard passageway section 80 provides an inboard portion 170 of the floor which is inclined downwardly relative to the passageway's longitudinal axis 174 from the main portion of the floor at bend 171 to floor level 22 of the static structure. The floor 180 of outboard passageway section 82 is cut away at its inner end to a point at 182 so that when outboard section 82 is fully retracted, as shown in FIG. 6, the inner end of its floor terminates adjacent the bend 171 in the floor of inboard section 80. In this manner the outboard section may be fully retracted within the inboard section while maintaining a smooth and continuous ramped floor in the passageway.

When passageway 72 is fully extended, there is an overlap between outboard section 82 and inboard section 80. In such an extended cantilevered position, the inner end of the outboard section presses up against the mating portions of inboard section 80, while that portion of the outboard section which is adjacent the outer end of inboard section 80 presses down thereon. Force transmitting rollers mounted at 182 and 186 on outboard section 82 serve to transmit these forces between the tubes while facilitating the telescoping of the tubes. Inasmuch as roller 182 which bears down upon inboard section 80 is located a substantial distance from the inner end of the outboard section, it is possible to cut away the floor of the outboard section to a point adjacent the roller without interfering with these force transmitting mechanisms which are necessary to maintain the structural integrity of the bridge when it is fully extended. The sidewalls 183 of the outboard passageway section are retained full length so that lateral forces between the inboard and outboard sections may be transmitted between rollers (not shown) mounted on outboard section side walls 183 and rails 185 running along the sidewalls of the inboard section.

As shown in FIG. 10, bridgehead 84 is preferably mounted upon outboard passageway section 82 at a slight angle so that the bridgehead is generally level when the over-the-wing bridge is aligned with the door of a large aircraft. For certain aircraft, it is necessary to depress passageway 72 below the angular positions shown in FIGS. 6 and 10. A tilting floor 190 is provided in bridgehead 84 to compensate for the tilt induced in the bridgehead with such depression of the passageway. Floor 190 is pivoted about a horizontal axis 192 which is located at the inboard side of the bridgehead. The other side of tilting floor 190 is supported by an adjustable mechanism such as screwjack 194 actuated by a motor 196.

A modified module 210 according to the present invention is shown in FIG. 11. In this embodiment, the same reference numerals have been applied to those components which are essentially the same as those incorporated in the embodiment of FIGS. 1 to 10. Two primary modifications are incorporated in module 210, the first being that the static structure 220 of the module is extended in a direction away from the module service face 18 to provide sufficient floor area to form a lounge in the module to accommodate passengers awaiting an aircraft. Secondly, the over-the-wing bridge 260 of module 210 incorporates a modified cantilevered structure in which a boxed torque carrying beam 290 extends horizontally across the roof line of static structure 220 and out over passageway 72 to support a tranverse track 100 at the center thereof in a so-called hammerhead design.

As this invention may be embodied in several forms without departing from the spirit or essential characteristics thereof, the present embodiments are illustrative and not restrictive. The scope of the invention is defined by the appended claims rather than by the description preceding them, and all embodiments which fall within the meaning and range of equivalency of the claims are therefore intended to be embraced by those claims.

I claim:
1. An aircraft loading bridge adapted to be supported from overhead to provide an access path extending between a doorway leading to a terminal and a doorway of an aircraft, the loading bridge having:
 (a) a passageway pivotally mounted at its inner end for vertical and horizontal swinging motion;
 (b) a fixed support structure for the outboard portions of the passageway;
 (c) track means mounted on the support structure above the passageway and oriented in a direction generally transverse to the passageway at a location a substantial distance out from the pivoted inner end of the passageway;
 (d) a carriage mounted on the track means for movement therealong;
 (e) vertically extensible support means mounted on the carriage and connected to the passageway at a position outward of its inner end;
 (f) and actuating means to controlledly move the carriage along the track means and further actuating means to extend or retract the vertically extensible support means whereby the passageway may be swung horizontally and vertically to mate with an aircraft doorway.
2. An aircraft loading bridge as defined in claim 1, said carriage including means to restrain lateral movement between the carriage and the passageway whereby undesirable lateral movement of the outer end of the passageway is prevented.
3. An aircraft loading bridge as defined in claim 2, said lateral restraining means including side guides depending from the carriage on each side of the passageway, said passageway having means mounted thereon to bear on the depending side guides to prevent lateral movement between the passageway and the carriage while permitting vertical movement therebetween as the passageway swings vertically about its inner end.
4. An aircraft loading bridge as defined in claim 1 wherein said support structure includes a ground supported section adjacent the inner end of the passageway and a cantilever section extending out from the ground supported section and supporting at its outer end the transverse track means on which the carriage is mounted.
5. An aircraft loading bridge as defined in claim 4 wherein the cantilever section of the support structure comprises two beams which extend out from the ground supported section from locations at the sides of the inner end of the passageway, the beams extending out at an upward inclination and at a divergent angle to each other whereby the outer ends of beams are above the level of the passageway.
6. An aircraft loading bridge as defined in claim 1 wherein the passageway includes at least two elongated telescoping sections which when fully extended overlap so as to provide for bearing support therebetween, the inboard section having a floor which includes two portions joined together at an angle, the outboard floor portion extending substantially parallel to the longitudinal axis of the inboard passageway section and the inboard floor portion sloping downwardly relative to the longitudinal axis of the section from the outboard floor portion toward the inner end of the inboard section, the outboard passageway section, when completely retracted, extending inwardly a substantial distance past the angular joint of the inboard and outboard floor portions of the inboard passageway section but having a floor which terminates short of the inner end of the outboard section at a point adjacent the angular floor joint of the inboard section thereby providing a continuous passageway floor even when the pasageway is retracted while maintaining proper support between the passageway sections when the passageway is telescopically extended.
7. An aircraft loading bridge as defined in claim 6 wherein the outboard passageway section telescopes within the inboard section and carries at the inner end of its floor a means forming a smooth ramp-like transition between the floor of the inboard and outboard passageway sections at all positions of telescopic extension of the passageway.

8. An aircraft loading bridge as defined in claim 1 wherein the passageway includes at least two elongated telescoping sections, the inboard section having a floor which includes two portions joined together at an angle, the outboard floor portion extending substantially parallel to the longitudinal axis of the inboard passageway section and the inboard floor portion sloping relative to the longitudinal axis of the section, the outboard passageway section having a floor which, when the section is completely retracted, terminates at its inner end and at a point adjacent the angular floor joint of the inboard passageway section thereby providing a continuous passageway floor at all telescopic positions of the passageway.

9. An aircraft loading bridge as defined in claim 1 together with an aircraft mating bridgehead at the outer end of the passageway mounted for rotation about a generally vertical axis, the bridgehead having a generally open aircraft engaging side and having a variably-inclined floor mounted in the bridgehead for pivoted movement about a generally horizontal axis oriented transverse to the aircraft engaging side of the bridgehead.

10. An aircraft loading module for servicing a plurality of aircraft doors on one side of one aircraft or doors on two or more aircraft comprising:
   (a) a static structure extending a substantial distance out into an aircraft parking area from one boundary thereof and having a module service face on one side of the static structure;
   (b) an overhead supported loading bridge adapted to mate with a rear door of an aircraft positioned substantially parallel to and alongside said module service face, the bridge comprising:
      (1) a passageway pivotally mounted for vertical and horizontal swinging motion about its inner end located adjacent the outer end of the static structure,
      (2) a cantilever support structure for the outboard portions of the passageway extending out from the static structure generally in a direction parallel to said module service face and thus adapted to extend over the wing of an aircraft positioned alongside the loading module,
      (3) track means mounted on the cantilever support structure above the passageway and oriented in a direction generally transverse to the passageway,
      (4) a carriage mounted on the track means for movement therealong,
      (5) and vertically extensible support means mounted on the carriage and connected to the passageway at a position outward of its inner end;
   (c) and another loading device positioned adjacent the static structure to mate with a forward door of an aircraft positioned alongside the loading module.

11. An aircraft loading module as defined in claim 10 wherein the loading device for mating with a forward aircraft door is a telescoping passageway extending transversely out from the module service face of the static structure.

12. An aircraft loading module as defined in claim 10 wherein the loading device for mating with a forward aircraft door is a further loading bridge comprising:
   (1) a passageway having its inner end mounted for vertical and horizontal swinging motion at a position adjacent the intersection of the module service face of the static structure with the boundary of the aircraft parking area and adapted to be swung to a position generally parallel to the module service face of the static structure,
   (2) and a bridgehead having a doorway and being mounted at the outer end of such passageway for rotation about a generally vertical axis to a position in which the plane of the bridgehead doorway is oriented generally parallel to the module service face of the static structure when such passageway is positioned adjacent to the module service face whereby such loading device is adapted to mate with a forward side door of an aircraft positioned alongside and parallel to the module service face.

References Cited

UNITED STATES PATENTS

| | | | |
|---|---|---|---|
| 1,882,512 | 10/1932 | Lovejoy | 14—72 |
| 2,700,169 | 1/1955 | Henion | 14—72 |
| 2,875,457 | 3/1959 | Read | 14—71 |
| 3,046,908 | 7/1962 | Der Yuen | 14—71 X |
| 3,099,847 | 8/1963 | Lodjic | 14—71 |
| 3,110,048 | 11/1963 | Bolton | 14—71 |
| 3,184,772 | 5/1965 | Moore | 14—71 |
| 3,317,942 | 5/1967 | Wollard | 14—71 |
| 3,462,787 | 8/1969 | Seipos | 14—71 |

NILE C. BYERS, JR., Primary Examiner